A. DE SANTIS.
PLANTING MACHINE.
APPLICATION FILED DEC. 12, 1916.
1,238,393.
Patented Aug. 28, 1917.
2 SHEETS—SHEET 1.
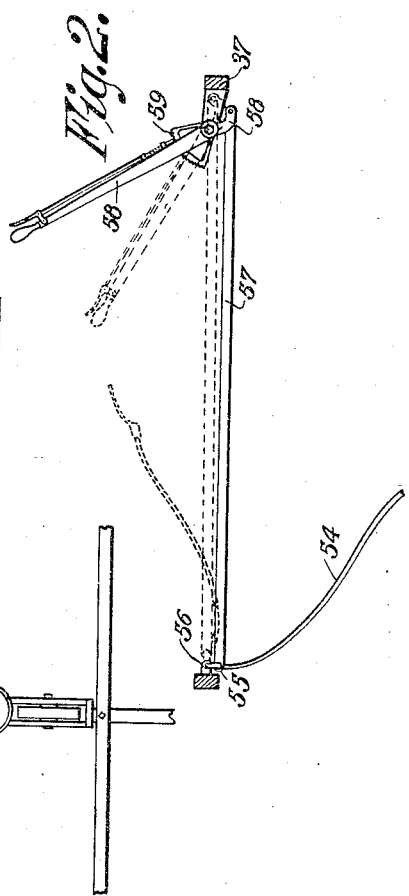
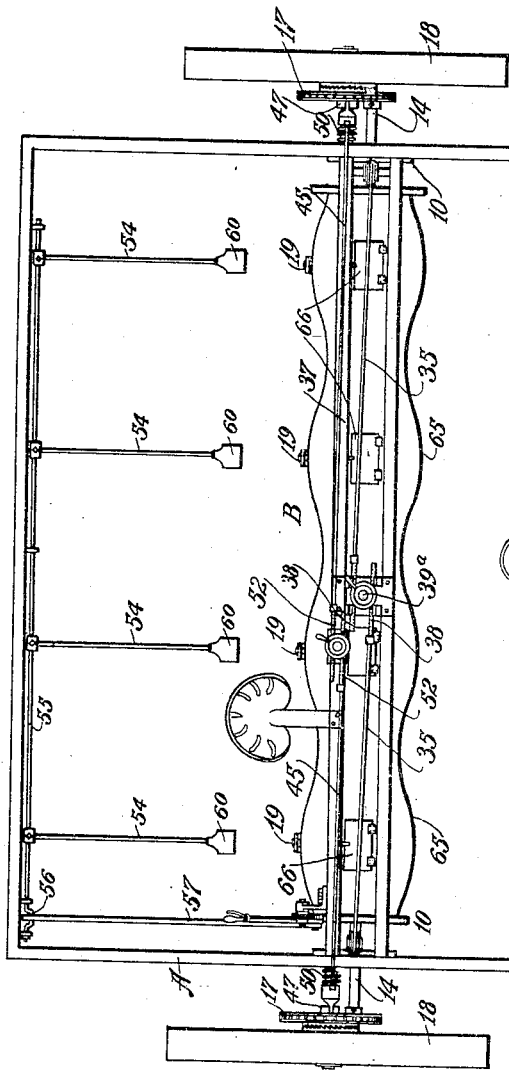
WITNESS:
B. A. Leaver.
INVENTOR,
Alfonso De Santis,
BY
ATTORNEY.

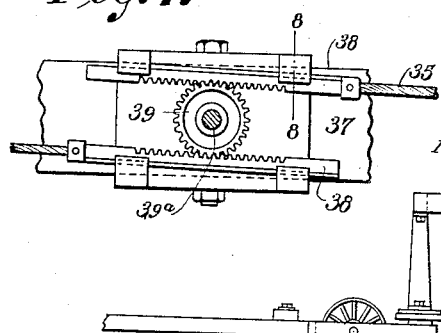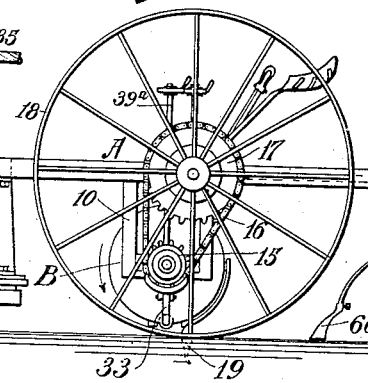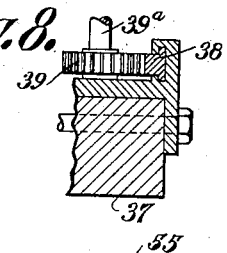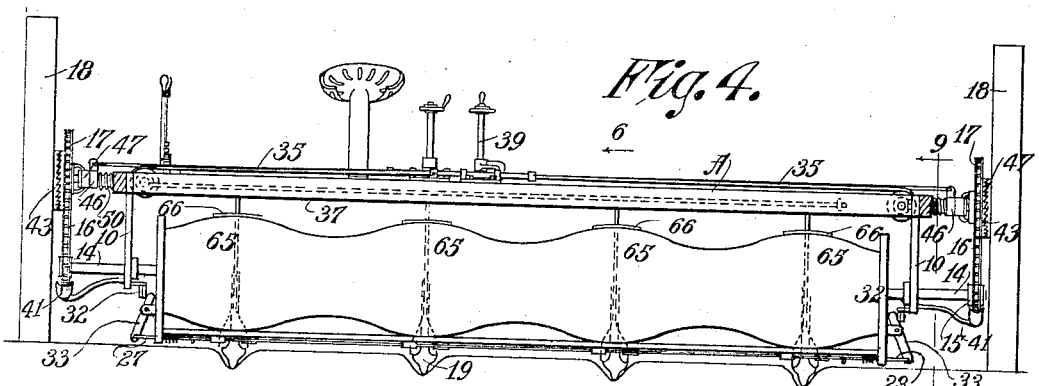

UNITED STATES PATENT OFFICE.

ALFONSO DE SANTIS, OF MONSON, MASSACHUSETTS.

PLANTING-MACHINE.

1,238,393.   Specification of Letters Patent.   Patented Aug. 28, 1917.

Application filed December 12, 1916. Serial No. 136,430.

*To all whom it may concern:*

Be it known that I, ALFONSO DE SANTIS, an Italian subject, and resident of Monson, in the county of Hampden and State of Massachusetts, have invented certain new and useful Improvements in Planting-Machines, of which the following is a full, clear, and exact description.

This invention relates to the planting machine, especially designed for the planting of potatoes, although capable of being used for the planting of other seed material.

The machine is one comprising a wheeled vehicle having mounted thereon a transverse axially horizontal revoluble barrel for containing the seed potatoes, said barrel carrying hole diggers, (for digging of the holes into which the potatoes are to be deposited,) while the machine is being forwardly drawn; the said barrel, moreover, has seed delivery openings, through which the potatoes may pass into the dug holes; and the barrel has doors or covers for normally closing the delivery opening with automatic means for periodically opening them.

The machine, furthermore, comprises blades or plates carried behind the barrel and adapted, by a scraping action along the ground, to restore the dirt or soil removed at the rear of the hole, into the hole, to cover the seeds.

The invention includes clutch mechanism in the driving connections between the traction wheels or axle and the barrel, and means for throwing the clutches out, at times when, in the progression of the machine over the land, it is not desired to dig hill holes and plant.

The machine also includes means for elevating the barrel so that when the machine is moving over the land or on a road, the diggers will be ineffective for their digging action.

The machine also comprises means for the throwing of the scraper blades upwardly above the ground level as required at times when the machine is not planting.

The invention is described in conjunction with the accompanying drawings and is set forth in the claims.

In the drawings:—

Figure 1 is a plan view showing the planting machine.

Fig. 2 is an elevation showing the device for throwing up the scrapers.

Fig. 3 is a side elevation of the machine.

Fig. 4 is a front elevation of the machine.

Fig. 5 is a bottom plan view showing the seed containing barrel and diggers and the mechanism for controlling the doors for the seed delivery openings in the barrel.

Fig. 6 is a cross sectional view through the barrel as taken on line 6—6, Fig. 4.

Fig. 7 is a plan view showing a portion of the barrel elevating mechanism,

Fig. 8 being a partial cross section on the line 8—8, Fig. 7, and

Fig. 9 is a partial end elevation as seen looking at the end of the barrel.

The frame A of the wheel vehicle has depending hangers 10, 10, provided with vertical guide ways 12 therein, (see Fig. 9) in which guide ways the slide members 13 are fitted and engaged for vertical movement.

The arbors or journal extensions 14, 14, of the barrel B are carried in the slides, and they have sprocket wheels 15, driven by chain 16 from sprocket wheel 17, clutchably connected with the traction wheel 18 of the machine.

Driving connections for the barrel rotate the latter in the direction of the arrow in Fig. 3, and in Fig. 6.

The barrel carries a plurality of suitably spaced digging blades or shovels 19 for scooping action to make the holes during the travel of the machine.

The barrel has delivery openings 20 in longitudinal lines of the machine corresponding to the locations of the diggers, and has closing plates for such openings,—these plates being here shown in pairs 22, 22, and understood as slidable to edgewise contact or overlap to close, and to be separated one from the other to open.

As shown in Fig. 5, one of each pair of the closing plates has connections with the opposite parallel members 24 of a long rectangular wire frame, The other of each pair of closing plates has connection with the opposite parallel members 25 of another long rectangular wire frame.

These frames are slidably guided on opposite parallel ribs or bars 26 extending lengthwise of and at the outer surface of the barrel, and the end portion 24ª of one wire frame has an extension 27 extended horizontally outwardly toward the hanger 10 at one end of the machine, while the wire frame has a similar but oppositely projecting end portion 25ª of the other extension 28.

The duplicated springs 30 are effective for normally forcing the frames 24, 25, in such directions as to maintain the closing plates which are respectively connected therewith in edgewise proximity, and closed.

On the face of each hanger is a member 32 to coact in the manner of a cam with a pivoted lever 33 carried by the end or head of the barrel and connected with the frame extension 27 or 28, so that in every revolution of the barrel when its openings are lowermost, the closing plates will be automatically opened for the delivery of one or more of the seed potatoes, etc., and then instantaneously closed under the reaction of the springs 30 as soon as the lever passes around clear from the member 32.

The journal slides 13 in which the barrel is revolubly mounted, and by which the barrel may be bodily moved, have means for their elevation, which in the present instance is shown as consisting of cords 35 or flexible connections connected to the slides and vertically extending therefrom over guiding sheaves and thence horizontally continued along a top transverse beam or bar 37 of the frame and connected with substantially parallel rack bars 38, 38, arranged in opposition and in slight separation and having the facing teeth thereof engaged by an axially vertical pinion 39 for which the vertical operating shaft 39ª is provided, the same having an operating hand wheel therefor. A detent may be provided in connection with a ratchet wheel on shaft 39ª.

41, 41, represent guards for the sprocket chains for maintaining them in their proper places especially when the barrel is elevated and the lower sprocket wheels are raised above the lower courses of such chains.

The sprocket wheels 17, 17, have the clutch members 43 in clutch with corresponding members on the traction wheels 18, and these sprocket wheels being slidable on the axle are operated through means of rods 45, 45, having connection through the yokes 46 with the sidable members 47 formed as part of or appurtenant to the sprocket wheel 17.

The springs 50, 50, maintain the sprocket wheels in clutch and a pinion actuated pair of rack bars 52, 52, substantially the same as those shown in Fig. 7, and before referred to, is effective, when properly operated, for drawing the sprocket wheels 17 out of clutch.

The scrapers for restoring the dirt into the hill holes after the seeds have been deposited therein from the barrel, are shown as comprising a plurality of normally forwardly and downwardly inclined resilient wire rods 54, 54,—carried at the rear of the frame,—on a rockshaft 55.

This rockshaft has a crank portion 56 which by link 57 is connected with the short arm of a pivoted lever 58, mounted on the part 37 of the frame.

A detent device 59 is associated with the lever for locking it in whatever position it may be placed.

The dirt restoring blades 60 carried by the resilient arm 54 which may be of a dust pan or shovel shape, have the positions thereof controlled by the lever, link and rockshaft devices described.

The barrel is shown as having bulged portions 65, 65, at regular intervals in the length thereof, as shown, the delivery opening and closing plates being provided at such bulged portions, the purpose of which latter is to form convergent walls by which the seeds will be gravitatively guided toward the openings.

66, 66, represent doors at the bulged portions of the barrel for the introduction of the seeds into the barrel.

I claim:

1. In a planting machine a wheeled vehicle carrying guides, and slides vertically movable in said guides, a revoluble seed containing barrel journaled on said slides, which is provided with outwardly projecting shovels for the digging of holes, and which is revolubly driven from the vehicle wheels, and which has openings for the delivery of the seed, movable closing plates for said openings, and automatic means including coacting parts on the guides and on the ends of the barrel for periodically opening and closing the plates.

2. In a planting machine a wheeled vehicle carrying guides, and slides vertically movable in said guides, a revoluble seed-containing barrel journaled on said slides, which is provided with outwardly projecting shovels for the digging of holes, and which is revolubly driven from the vehicle wheels, and which has openings for the delivery of the seed, longitudinally movable closing plates for said openings, an elongated frame, guided for lengthwise movement on the barrel adjacent its openings, connected with the plates and having an extension projecting into proximity to one of the slides, a lever intermediately pivoted on the end of the barrel, and connected with said extension, a cam on one of the guides, in the path of revolution of the lever, with which the latter coacts, and a spring for exerting a retracting action on the plate connecting frame.

3. In a planting machine a wheeled vehicle carrying guides, and slides vertically movable with guides, a revoluble seed-containing barrel,—journaled on said slides, and revolubly driven from the vehicle wheels,—which has outwardly bulged portions at intervals in its length, which at said bulged portions is provided with outwardly projecting shovels for the digging of holes, and which also has openings at such bulged portions for the delivery of the seed; parallel bars or ribs on and along the barrel at opposite sides of said openings, longitudinally movable closing plates for said openings, an elongated wire frame, guided for lengthwise movement on said bars, and connected with the plates and having an extension projecting into proximity to one of the guides, a lever intermediately pivoted on the end of the barrel, and connected with said extension, a cam on one of the guides, in the path of revolution of the lever, with which the latter coacts, and a spring for exerting a retracting action on the plate connecting frame.

4. In a planting machine a wheeled vehicle having mounted thereon a revoluble seed-containing barrel which is provided with outwardly projecting shovels for the digging of holes, and which is revolubly driven from the vehicle wheels, and which has openings for the delivery of the seeds, movable closing plates for said openings, automatic means for periodically opening and closing said plates, blades resiliently carried by the vehicle behind and in line with the barrel carried shovels, for restoring the displaced dirt into the shovel produced holes, and respective means for elevating and lowering the barrel carried shovels, and the dirt restoring blades.

5. In a planting machine a wheeled vehicle carrying vertically movable slides, and guides on which they are movable, a revoluble seed-containing barrel, journaled on said slides, and revolubly driven from the power of the vehicle wheels,—which is provided with outwardly projecting shovels for the digging of holes, and which also has openings for the delivery of the seeds, longitudinally movable closing plates for said openings, an elongated wire frame, guided for lengthwise movement on said bars, and connected with the plates and having an extension projecting into proximity to one of the guides, levers intermediately pivoted on the end of the barrel, and connected with said extension, a cam on one of the guides in the path of revolution of the lever, with which the latter coacts, and a spring for exerting a retracting action on the plate-connecting frame, guiding sheaves and opposite rack bars on an upper part of the vehicle, a pinion between and coacting with the racks, flexible connections attached to the racks and to the slides and intermediately guided by the sheaves, and means for turning the pinion.

6. In a planting machine a wheeled vehicle having mounted thereon a revoluble seed containing barrel which is provided with outwardly projecting shovels for the digging of holes, which is revolubly driven from the vehicle wheels, and which has openings for the delivery of the seeds, movable closing plates for said openings, and automatic means for periodically opening and closing said plates, a rocking shaft mounted on a rear portion of the vehicle having a cranked portion and provided with downwardly and forwardly extended resilient members having, at their lower ends, dirt restoring blades, a lever mounted on the vehicle forward of the rock shaft, a link connected to said lever and to the cranked portion of the rock shaft, and a device for detachably locking the lever in any given set position.

7. In a planting machine a wheeled vehicle carrying vertically movable slides, and guides therefor, a revoluble seed-containing barrel journaled on said slides, which is provided with outwardly projecting shovels for the digging of holes, and provided with a sprocket wheel, and which has openings for the delivery of the seed, longitudinally movable closing plates for said openings, an elongated frame, guided for lengthwise movement on the barrel adjacent its openings, connected with the plates and having an extension projecting into proximity to one of the guides, a lever intermediately pivoted on the end of the barrel, and connected with said extension, a cam on one of the guides, in the path of revolution of the lever, with which the latter coacts, and a spring for exerting a retracting action on the plate connecting frame, a sprocket wheel, driven from a wheel of the vehicle, above the sprocket on the barrel, a chain in running engagement around said sprocket wheels and a guard supported by one of the guides for holding the lower part of the chain in its working proximity to the lower sprocket wheel when the slide is elevated in the guide and the chain slackens.

Signed by me at Springfield, Mass., in presence of two subscribing witnesses.

ALFONSO DE SANTIS.

Witnesses:
EZIO DE SANTIS,
WM. S. BELLOWS.

Copies of this patent may be obtained for five cents each, by addressing the "Commissioner of Patents, Washington, D. C."